United States Patent
Fung et al.

(10) Patent No.: US 9,998,213 B2
(45) Date of Patent: Jun. 12, 2018

(54) NETWORK TAP WITH BATTERY-ASSISTED AND PROGRAMMABLE FAILOVER

(71) Applicant: Ixia, Calabasas, CA (US)

(72) Inventors: Randy Fung, San Jose, CA (US); Marcel Felix Desdier, Pleasanton, CA (US); Ky Hong Le, San Jose, CA (US)

(73) Assignee: KEYSIGHT TECHNOLOGIES SINGAPORE (HOLDINGS) PTE. LTD., Singapore (SG)

( * ) Notice: Subject to any disclaimer, the term of this patent is extended or adjusted under 35 U.S.C. 154(b) by 0 days. days.

(21) Appl. No.: 15/355,013

(22) Filed: Nov. 17, 2016

(65) Prior Publication Data

US 2018/0034542 A1    Feb. 1, 2018

Related U.S. Application Data

(60) Provisional application No. 62/368,749, filed on Jul. 29, 2016.

(51) Int. Cl.
  *H04B 10/032* (2013.01)
  *H04Q 11/00* (2006.01)

(52) U.S. Cl.
  CPC ....... *H04B 10/032* (2013.01); *H04Q 11/0071* (2013.01); *H04Q 2011/0081* (2013.01); *H04Q 2213/13217* (2013.01)

(58) Field of Classification Search
  CPC combination set(s) only.
  See application file for complete search history.

(56) References Cited

U.S. PATENT DOCUMENTS

| | | | |
|---|---|---|---|
| 4,802,161 A | 1/1989 | Byars et al. |
| 5,173,794 A | 12/1992 | Cheung et al. |
| 5,550,802 A | 8/1996 | Worsley et al. |
| 5,648,965 A | 7/1997 | Thadani et al. |
| 5,710,846 A | 1/1998 | Wayman et al. |
| 5,774,453 A | 6/1998 | Fukano et al. |
| 5,781,318 A | 7/1998 | Tremblay |

(Continued)

FOREIGN PATENT DOCUMENTS

| EP | 2091199 | 8/2009 |
|---|---|---|
| JP | 2001-197066 A | 7/2001 |

(Continued)

OTHER PUBLICATIONS

Notice of Allowance and Fee(s) Due for U.S. Appl. No. 13/944,801 (dated Apr. 21, 2017).

(Continued)

*Primary Examiner* — David Payne
*Assistant Examiner* — Omar S Ismail

(57) ABSTRACT

A network tap with battery assisted and programmable failover is disclosed. The network tap includes a processing element, at least one optical-electrical transceiver, and at least one multiplexer/demultiplexer module. A backup battery provides power to the optical-electrical transceiver(s) and the multiplexer/demultiplexer module(s) but not the processing element when operating in a failover mode. The network tap is programmable to operate in a fail open mode in which traffic received from the network passes through the network tap during failover or a fail closed mode in which traffic receive from the network is blocked during failover.

18 Claims, 6 Drawing Sheets

(56) References Cited

U.S. PATENT DOCUMENTS

| | | | |
|---|---|---|---|
| 5,898,837 A | 4/1999 | Guttman et al. |
| 5,983,308 A | 11/1999 | Kerstein |
| 6,041,037 A | 3/2000 | Nishio et al. |
| 6,047,321 A | 4/2000 | Raab et al. |
| 6,108,310 A | 8/2000 | Wilkinson et al. |
| 6,167,025 A | 12/2000 | Hsing et al. |
| 6,181,677 B1 | 1/2001 | Valli et al. |
| 6,239,579 B1 | 5/2001 | Dunn et al. |
| 6,272,136 B1 | 8/2001 | Lin et al. |
| 6,366,557 B1 | 4/2002 | Hunter |
| 6,424,627 B1 | 7/2002 | Sorhaug et al. |
| 6,449,247 B1 | 9/2002 | Manzardo et al. |
| 6,542,145 B1 | 4/2003 | Reisinger et al. |
| 6,650,803 B1 | 11/2003 | Ramaswami et al. |
| 6,658,565 B1 | 12/2003 | Gupta et al. |
| 6,687,009 B2 | 2/2004 | Hui et al. |
| 6,687,847 B1 | 2/2004 | Aguilera et al. |
| 6,714,976 B1 | 3/2004 | Wilson et al. |
| 6,798,740 B1 | 9/2004 | Senevirathne et al. |
| 6,801,840 B2 | 10/2004 | Kodama et al. |
| 6,801,940 B1 | 10/2004 | Moran et al. |
| 6,823,383 B2 | 11/2004 | MacBride |
| 6,836,540 B2 | 12/2004 | Falcone et al. |
| 6,841,985 B1 | 1/2005 | Fetzer |
| 6,850,706 B2 | 2/2005 | Jager et al. |
| 6,882,654 B1 | 4/2005 | Nelson |
| 6,898,630 B2 | 5/2005 | Ueno et al. |
| 7,027,437 B1 | 4/2006 | Merchant et al. |
| 7,061,942 B2 | 6/2006 | Noronha, Jr. et al. |
| 7,171,504 B2 | 1/2007 | Ishii |
| 7,277,957 B2 | 10/2007 | Rowley et al. |
| 7,284,055 B1 | 10/2007 | Oehrke et al. |
| 7,308,705 B2 | 12/2007 | Gordy et al. |
| 7,321,565 B2 | 1/2008 | Todd et al. |
| 7,324,553 B1 | 1/2008 | Varier et al. |
| 7,362,765 B1 | 4/2008 | Chen |
| 7,415,013 B1 | 8/2008 | Lo |
| 7,430,354 B2 | 9/2008 | Williams |
| 7,477,611 B2 | 1/2009 | Huff |
| 7,486,624 B2 | 2/2009 | Shaw et al. |
| 7,505,416 B2 | 3/2009 | Gordy et al. |
| 7,594,095 B1 | 9/2009 | Nordquist |
| 7,616,587 B1 | 11/2009 | Lo et al. |
| 7,788,365 B1 | 8/2010 | Foster et al. |
| 8,077,049 B2 | 12/2011 | Yaney et al. |
| 8,755,293 B2 | 6/2014 | Matityahu et al. |
| 8,902,735 B2 | 12/2014 | Matityahu et al. |
| 9,749,261 B2 | 8/2017 | Matityahu et al. |
| 2001/0040870 A1 | 11/2001 | Ohmori et al. |
| 2002/0003592 A1 | 1/2002 | Hett et al. |
| 2002/0026374 A1 | 2/2002 | Moneymaker et al. |
| 2002/0032880 A1 | 3/2002 | Poletto et al. |
| 2002/0073199 A1 | 6/2002 | Levine et al. |
| 2002/0087710 A1 | 7/2002 | Aiken et al. |
| 2002/0146016 A1 | 10/2002 | Liu et al. |
| 2002/0176355 A1 | 11/2002 | Mimms et al. |
| 2002/0180592 A1 | 12/2002 | Gromov |
| 2003/0090995 A1 | 5/2003 | Illikkal et al. |
| 2003/0112760 A1 | 6/2003 | Puppa et al. |
| 2003/0142666 A1 | 7/2003 | Bonney et al. |
| 2003/0145039 A1 | 7/2003 | Bonney et al. |
| 2003/0215236 A1 | 11/2003 | Manifold |
| 2004/0008675 A1 | 1/2004 | Basso et al. |
| 2004/0023651 A1 | 2/2004 | Gollnick et al. |
| 2004/0046516 A1 | 3/2004 | Uekawa |
| 2004/0062556 A1 | 4/2004 | Kubo et al. |
| 2004/0096227 A1 | 5/2004 | Bulow |
| 2004/0109411 A1 | 6/2004 | Martin |
| 2004/0128380 A1 | 7/2004 | Chen et al. |
| 2004/0202164 A1 | 10/2004 | Hooper et al. |
| 2004/0215832 A1 | 10/2004 | Gordy et al. |
| 2004/0264494 A1 | 12/2004 | Kim |
| 2005/0060535 A1 | 3/2005 | Bartas |
| 2005/0071711 A1 | 3/2005 | Shaw |
| 2005/0108444 A1 | 5/2005 | Flauaus et al. |
| 2005/0122910 A1 | 6/2005 | Parupudi et al. |
| 2005/0129033 A1 | 6/2005 | Gordy et al. |
| 2005/0132051 A1 | 6/2005 | Hill et al. |
| 2005/0271065 A1 | 12/2005 | Gallatin et al. |
| 2005/0278565 A1 | 12/2005 | Frattura et al. |
| 2006/0083511 A1 | 4/2006 | Edmunds et al. |
| 2006/0200711 A1 | 9/2006 | Schondelmayer et al. |
| 2006/0215566 A1 | 9/2006 | Walsh |
| 2006/0282529 A1 | 12/2006 | Nordin |
| 2007/0064917 A1 | 3/2007 | Matityahu et al. |
| 2007/0081549 A1 | 4/2007 | Cicchetti et al. |
| 2007/0081553 A1 | 4/2007 | Cicchetti et al. |
| 2007/0121499 A1 | 5/2007 | Pal et al. |
| 2007/0140398 A1 | 6/2007 | Inoue et al. |
| 2007/0171966 A1 | 7/2007 | Light et al. |
| 2007/0211682 A1 | 9/2007 | Kim et al. |
| 2007/0218874 A1 | 9/2007 | Sinha et al. |
| 2008/0049627 A1 | 2/2008 | Nordin |
| 2008/0072291 A1 | 3/2008 | Carley |
| 2008/0168283 A1 | 7/2008 | Penning |
| 2008/0214108 A1 | 9/2008 | Beigne et al. |
| 2008/0296685 A1 | 12/2008 | Sonehara et al. |
| 2009/0041051 A1 | 2/2009 | Matityahu et al. |
| 2009/0162057 A1* | 6/2009 | Friedrich ............ H04Q 11/0005 398/43 |
| 2009/0178144 A1 | 7/2009 | Redlich et al. |
| 2009/0210649 A1 | 8/2009 | Wan et al. |
| 2009/0303883 A1 | 12/2009 | Kucharczyk et al. |
| 2010/0014605 A1 | 1/2010 | Geile et al. |
| 2010/0167713 A1 | 7/2010 | Hoffman |
| 2010/0183298 A1 | 7/2010 | Biegert et al. |
| 2010/0195538 A1 | 8/2010 | Merkey et al. |
| 2010/0247068 A1 | 9/2010 | Howarter et al. |
| 2010/0254310 A1 | 10/2010 | Kats et al. |
| 2011/0161544 A1 | 6/2011 | Chengson et al. |
| 2011/0211446 A1 | 9/2011 | Matityahu et al. |
| 2011/0211473 A1 | 9/2011 | Matityahu et al. |
| 2011/0249968 A1* | 10/2011 | Ou ..................... H04B 10/40 398/25 |
| 2012/0176917 A1 | 7/2012 | Matityahu et al. |
| 2014/0341568 A1* | 11/2014 | Zhang ................. H04J 14/0212 398/34 |
| 2016/0182150 A1* | 6/2016 | Sprenger .......... H04B 10/07955 398/5 |

FOREIGN PATENT DOCUMENTS

| | | |
|---|---|---|
| JP | 2006-148686 A | 6/2006 |
| KR | 10-2004-0058415 A | 7/2004 |
| WO | WO-2002/019642 A1 | 3/2002 |
| WO | WO-2004/012163 A2 | 2/2004 |
| WO | WO-2005/043838 A1 | 5/2005 |

OTHER PUBLICATIONS

"PeriScope Central Management System (CMS) 5.0 Administrator's Guide", Peribit Networks, Inc. 13 pages total (2003-2004).

"Sequence Reducer/Sequence Mirror Operator's Guide", Peribit Networks, Inc. 13 pages total. (2005).

"VSS Coppertap Literature", VSS Monitoring Inc. 2 pages. (2003-2004).

"VSS Easy Install Guide", VSS Monitoring Inc. 8 pages total. 2003-2005.

"VSS Linksafe", VSS Monitoring Inc., 1 page. (2003-2005).

Advisory Action for U.S. Appl. No. 13/034,730 (dated Sep. 12, 2013).

Anonymous, "100Base-TX/100BBase-FX Media Converters E-100BTX-FX-04 User's Guide", Transitions Networks, Minneapolis, MN, Copyright 1998-2000, 4 pages.

Belkin International, Inc., "Belkin Quick Installation Guide", N1 Vision Wireless Router, Belkin International, Inc., Compton, CA, Feb. 11, 2009, 3 pages total. (Feb. 11, 2009).

Communication pursuant to Article 94(3) EPC for European Patent Application No. 12 760 718.2 (dated Jan. 17, 2017).

Extended European Search Report for European Patent Application No. 11748109.3 (dated Jul. 20, 2016).

(56) References Cited

OTHER PUBLICATIONS

"Fast Ethernet Fiber-to-Fiber Converters", Canary Communications, Inc. 7 pages total, 2004.
Final Office Action for U.S. Appl. No. 13/034,730 (dated Jun. 5, 2013).
Final Office Action for U.S. Appl. No. 13/070,086 (dated Aug. 9, 2013).
Gigamon Systems LLC, "GigaVUE—Product Brief", Gigamon Systems LLC, http://web.archive.org/web/20070815021951/www.gigamon.com/pdf/GigamonSystems-OnePageProductBrief.pdf Aug. 15, 2007, 1 page. (Aug. 15, 2007).
International Preliminary Report on Patentability, PCT Application No. PCT/US2011/026159, dated Sep. 13, 2012. (dated Sep. 13, 2012).
International Search Report, PCT Application No. PCT/US2011/026159, dated Nov. 30, 2011. (dated Nov. 30, 2011).
International Search Report, PCT Application No. PCT/US2012/030448, dated Oct. 19, 2012. (dated Oct. 19, 2012).
Non-Final Office Action for U.S. Appl. No. 13/944,801 (dated Apr. 27, 2015).
Non-Final Office Action for U.S. Appl. No. 13/034,730 (dated Mar. 13, 2014).
Non-Final Office Action for U.S. Appl. No. 13/070,086 (dated Jan. 25, 2013).
Non-Final Office Action for U.S. Appl. No. 13/034,730 (dated Dec. 6, 2012).
Notice of Allowance and Fee(s) Due for U.S. Appl. No. 13/944,801 (dated Nov. 23, 2016).
Notice of Allowance and Fee(s) Due for U.S. Appl. No. 13/944,801 (dated Jul. 1, 2016).
Notice of Allowance and Fee(s) Due for U.S. Appl. No. 13/944,801 (dated Jan. 21, 2016).
Notice of Allowance for U.S. Appl. No. 13/034,730 (dated Jul. 30, 2014).
Notice of Allowance for U.S. Appl. No. 13/070,086 (dated Feb. 4, 2014).
Written Opinion, PCT Application No. PCT/US2011/026159, dated Nov. 30, 2011. (Nov. 30, 2011).
Written Opinion, PCT Application No. PCT/US2012/030448, dated Oct. 19, 2012. (Oct. 19, 2012).
Communication pursuant to Article 94(3) EPC for European Application No. 11 748 109.3 (dated Feb. 28, 2018).

\* cited by examiner

NETWORK TAP WITH BATTERY-ASSISTED AND PROGRAMMABLE FAILOVER

PRIORITY CLAIM

This application claims the benefit of U.S. Provisional Patent Application Ser. No. 62/368,749, filed Jul. 29, 2016; the disclosure of which is incorporated herein by reference in its entirety.

TECHNICAL FIELD

The subject matter described herein relates to network taps. More particularly, the subject matter described herein relates to network tap with battery assisted and programmable failover.

BACKGROUND

Network taps are devices used to monitor traffic in live networks. A network tap receives a signal from the network, copies or diverts the signal to one or more monitoring processors, and transmits the original signal back to the network. In today's high speed networks, network taps tap optical and electrical signals.

Because a network tap is typically used as inline component, the network operator needs to account for the case when the network tap fails, for example, due to loss of external power. Network taps include pairs of ports that connect to the network. One port of a port pair may connect to a cable to receive a signal from the network, and another port of the pair may connect to a cable to provide the signal back to the network. If a failure of external power occurs, one type of network tap automatically fails open to allow traffic to pass through the network tap. Traffic flow continuity is provided by optical switches connected between ingress and egress port pairs that close when external power is disconnected. The optical switches do not require power to close and thus prevents an interruption in traffic flow to or from the network.

One problem with utilizing optical switches between network tap ports to provide automatic fail open capability is that an optical switch must be provided for each ingress/egress port pair in the network tap, and optical switches are expensive. For a network tap that includes multiple port pairs, providing an optical switch between every port pair can greatly increase the cost of the network tap.

Another feature of some network taps when external power is disconnected is temporary battery backup of all of the components of the network tap, including the components that perform network monitoring functions. For these taps, when external power fails, a backup battery allows the tap to function in the same mode as the tap functioned prior to the failure. That is, the battery powers the full network monitoring functionality of the network tap. One problem with such an approach is that a large battery may be required to fully power the tap for extended periods of time when external power is lost.

Another problem with existing network taps is that the taps either fail open or fail closed. "Fail open", as used herein, means that the network tap allows network traffic between ingress and egress network port pairs. "Fail closed" means that the network tap blocks network traffic between ingress and egress port pairs. Such inflexibility in failover operation limits the utility of such network taps.

SUMMARY

According to one aspect of the subject matter described herein a network tap includes a processing element. The network tap further includes at least one optical-electrical transceiver for receiving an optical signal from a network and for converting the optical signal into an electrical signal. The network tap further includes at least one multiplexer/demultiplexer module coupled to the at least one optical-electrical transceiver for operating in a first mode when the network tap is externally powered, wherein, when operating in the first mode, the at least one multiplexer/demultiplexer module provides the electrical signal to the processing element, which performs a network monitoring task for the electrical signal, wherein the at least one multiplexer/demultiplexer module is configured to operate in a second mode comprising a fail open mode when the network tap is not externally powered wherein, when operating in the second mode, the at least one multiplexer/demultiplexer module ceases providing the electrical signal to the processing element and implements a loopback operation for the electrical signal. The network tap further includes a power source internal to the network tap for providing temporary power to optical-electrical transceiver and the multiplexer/demultiplexer module for operating in the second mode.

According to another aspect of the subject matter described herein, a network tap includes a processing element. The network tap further includes at least one optical-electrical transceiver for receiving an optical signal from a network and for converting the optical signal into an electrical signal. The network tap further includes at least one multiplexer/demultiplexer module coupled to the at least one optical-electrical transceiver for operating in a first mode when the network tap is externally powered, wherein, when operating in the first mode, the at least one multiplexer/demultiplexer module provides the electrical signal to the processing element, which performs a network monitoring task for the electrical signal. The network tap further includes a multiplexer/demultiplexer controller coupled to the at least one multiplexer/demultiplexer module, wherein the multiplexer/demultiplexer controller is programmable to control the at least one multiplexer/demultiplexer module to operate in a second mode comprising a fail open mode or a third mode comprising a fail closed mode when the tap is not externally powered wherein, when operating in the second mode, the at least one multiplexer/demultiplexer module ceases providing the electrical signal to the processing element and implements a loopback operation for the electrical signal and wherein, when operating in the third mode, the at least one multiplexer/demultiplexer module blocks the providing of the optical signal to the network.

Although network tap functionality, battery-assisted bypass functionality, and programmable bypass functionality as described herein is primarily implemented in hardware, portions of the subject matter described herein can be implemented in software in combination with hardware and/or firmware. For example, a portion of the subject matter described herein can be implemented in software executed by a processor. The software-implemented portion may include network monitoring functionality implemented by the processing element of the network tap when the network tap is in its normal operating mode with access to external power. In one exemplary implementation, the software portion of subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the software portion of subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
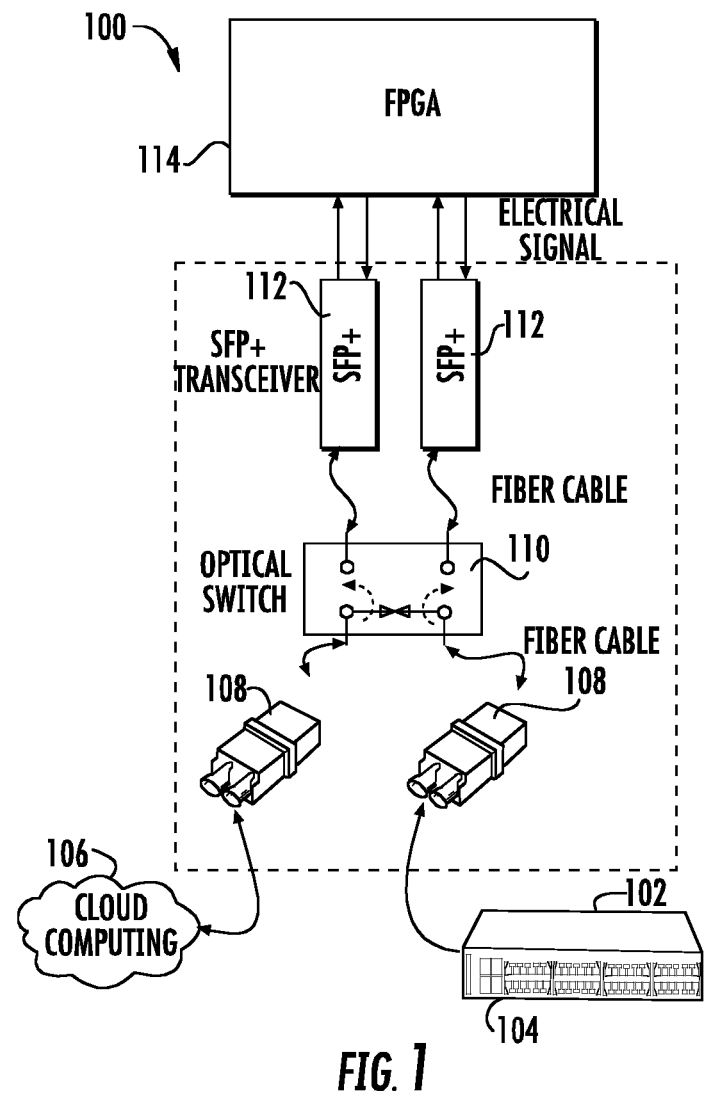
FIG. 1 is a block diagram of a conventional network tap.

FIG. 1 is a diagram illustrating an exemplary architecture for an existing network tap. In FIG. 1, network tap 100 includes a housing 102 with a plurality of ports 104 located on the front panel of housing 102. Each pair of ports includes one port that receives a cable that provides bi-directional communication with a network 106 and the other port connects to a cable for providing bi-directional communication with the same or a different network. Thus, tap 100 is designed to operate as an inline tap. Between each pair of ports 104, is a pair of Lucent connector (LC) adapters 108, an optical switch 110, and small form factor pluggable plus (SFP+) transceivers 112. LC adapters 108 terminate external optical fiber connections and align the external fiber cores with internal fiber connections. Optical switch 110 operates in a first position to communicate network traffic to and from SFP+ transceiver 112 when network tap 100 is operating in its normal mode under external power. The position of optical switch 110 when network tap 100 is operating in its normal mode is illustrated by the dashed arrows illustrated in FIG. 1. Optical switch 110 operates in a mode indicated by the solid arrows in FIG. 1 to conduct traffic between LC adapters 108 when network tap 100 loses its external power supply. SFP+ transceivers 112 convert the optical signals received from the network into electrical signals and convert the electrical signals received from a field programmable gate array (FPGA) 114 to optical signals. FPGA 114 may perform a network monitoring task, such as copying and forwarding received traffic to a network data collection function, an intrusion detection function, etc. FPGA 114 may also forward the original network traffic stream to the egress network port via one of SFP+ transceivers 112 and LC adapter 108.

One problem with the architecture illustrated in FIG. 1 is an optical switch 110 is required per pair of network ports. As indicated above, requiring an optical switch per pair of network ports increases the cost of network tap 100. Another problem with the architecture illustrated in FIG. 1 is that the functionality of network tap 100 when external power is lost is limited to the fail open mode in which network traffic flows through network tap 100.

Figure 2:
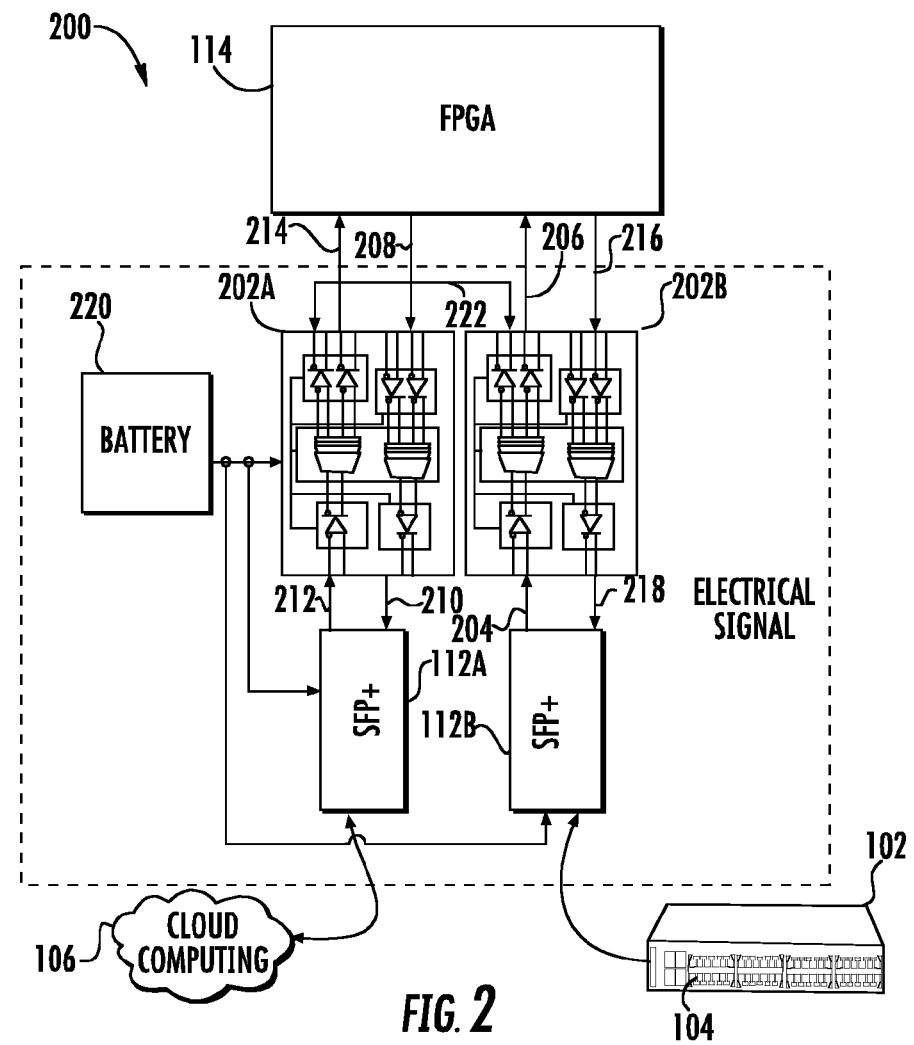
FIG. 2 is a block diagram illustrating a network tap with battery assisted failover according to an aspect of the subject matter described herein.

FIG. 2 is a block diagram illustrating an exemplary network tap according to an aspect of the subject matter described herein. Referring to FIG. 2, a network tap 200 includes a housing 102 with a plurality of ports 104 for connecting to network 106 using fiber optic cables. SFP+ transceivers 112A and 112B convert received optical signals to electrical signals and convert received electrical signals to optical signals. In one example, the optical signals received from and transmitted to the network may be Ethernet signals, such as 10 Gigabit Ethernet signals. Multiplexer/demultiplexer modules 202A and 202B operate in a first mode when network tap 200 is connected to external power. In the first mode, multiplexer/demultiplexer module 202B receives a first electrical signal indicated by connection 204 from SFP+ transceiver 112B and provides the first electrical signal to FPGA 114 indicated by connection 206. The first electrical signal is processed by FPGA 114. The first electrical signal is then provided by FPGA 114 to multiplexer/demultiplexer module 202A, as indicated by connection 208. Multiplexer/demultiplexer module 202A provides the first electrical signal to SFP+ transceiver 112B as indicated by connection 210. SFP+ transceiver 112 provides the received electrical signal to network 106.

Similarly, in the first mode of operation, SFP+ transceiver 112A converts optical signals received from network 106 into electrical signals and provides the electrical signals to multiplexer/demultiplexer module 202A, as indicated by connection 212. Multiplexer/demultiplexer module 202A provides the electrical signal from SFP+ transceiver 112A to FPGA 114, as indicated by connection 214. FPGA 114 provides the electrical signal to multiplexer/demultiplexer module 202B, as indicated by connection 216. Multiplexer/demultiplexer module 202B provides the electrical signal from FPGA 114 to SFP+ transceiver 112B, as indicated by connection 218. SFP+ transceiver 218 converts the electrical signal into an optical signal provides the optical signal to the network via one of ports 104.

Thus, in the first mode of operation, the traffic flow is from the network, through one of the transceivers 112A or 112B, through one of the multiplexer/demultiplexer modules 202A or 202B, to the FPGA or other processing element for network monitoring processing, and back to the network. Rather than continuing the same traffic flow when external power to network tap 200 is lost, network tap 200 includes an internal power source, such as battery 220, that powers only multiplexer/demultiplexer modules 202A and 202B and transceivers 112A and 112B. Power is preferably not provided to FPGA 114, which reduces the required size of battery 220. In one example, when external power is lost, network tap 200 operates on a second node where electrical signals to and from network 106 pass through SFP+ transceivers 112A and 112B and through multiplexer/demultiplexer modules 202A and 202B but not through FPGA 114. For example, a signal received from network 106 through SFP+ transceiver 112B is provided to multiplexer/demultiplexer module 202B. Rather than passing the signal to FPGA 114 for network monitoring processing, the signal bypasses network monitoring processing by being provided from multiplexer/demultiplexer module 202B to multiplexer/demultiplexer module 202A through a bypass path between multiplexer/demultiplexer modules 202A and 202B. This bypass path is indicated by arrow 222. The signal is then provided to SFP+ transceiver 112A, which converts the signal to an optical signal and provides the signal to network 106.

A similar failover path is implemented for traffic from network 106 that enters network tap 100 via the port corresponding to SFP+ transceiver 112A when external power is lost. For example, an optical signal from network 106 will be received by SFP+ transceiver 112A. SFP+ transceiver 112A converts the received optical signal to an electrical signal and provides the signal to multiplexer/demultiplexer module 202A. Multiplexer/demultiplexer module 202A provides the electrical signal to multiplexer/demultiplexer module 202B via bypass path 222. Multiplexer/demultiplexer module 202B provides the electrical signal to SFP+ transceiver 112B which converts the electrical signal to an optical signal and provides the electrical signal to network 106 or another network through an external optical cable.

Thus, in the architecture illustrated in FIG. 2, an internal power source 220 powers only the functionality of network tap 200 required to operate in the second or bypass mode. Such a solution is advantageous over solutions such as that in FIG. 1 where optical switches are required per port pair. In addition, such a solution is advantageous over solutions that require batteries to back up the entire functionality of network tap 200.

Figure 3:
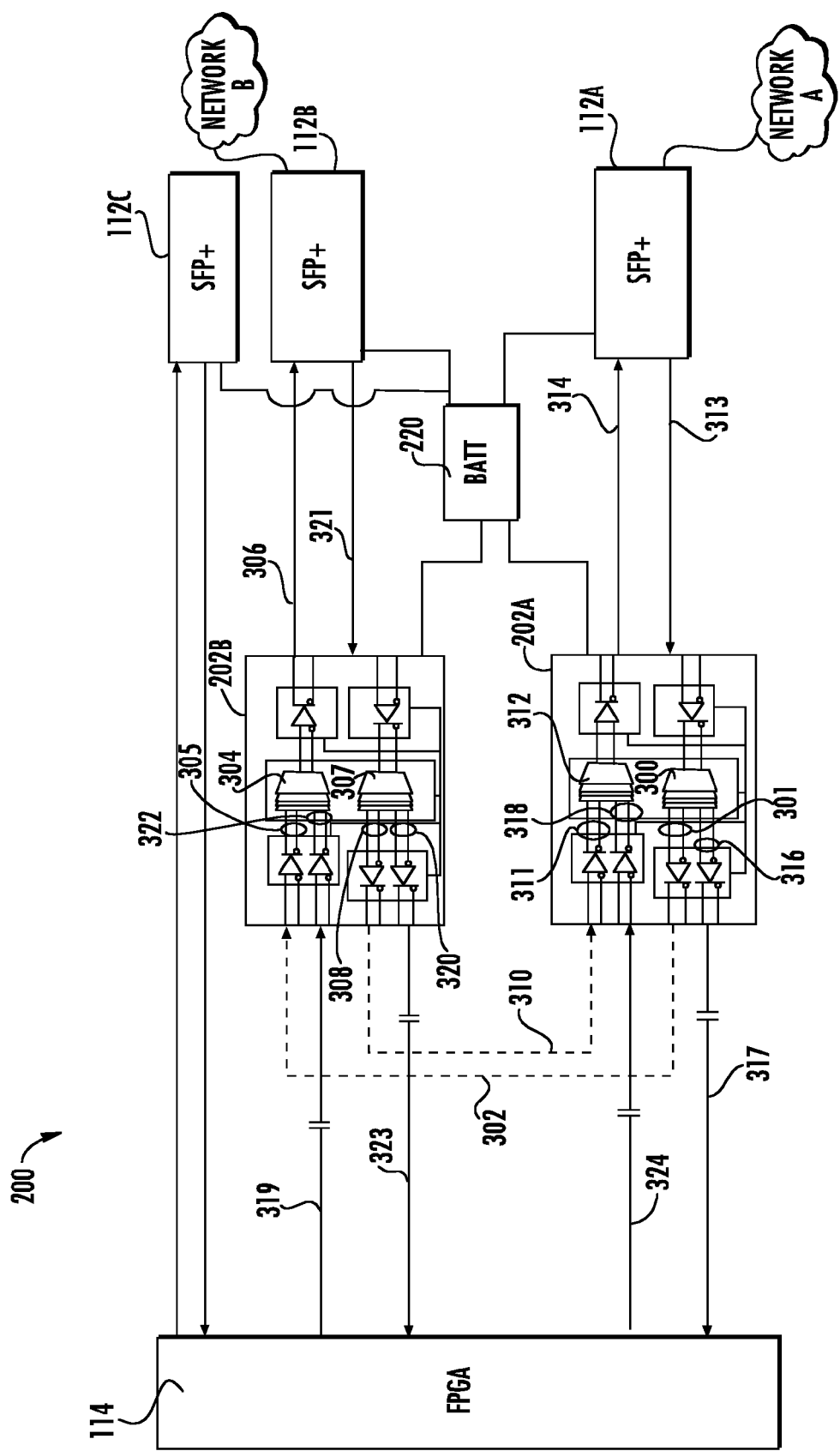
FIG. 3 is a network tap illustrating an exemplary traffic flow through the network tap illustrated in FIG. 2.

FIG. 3 illustrates the traffic flow through the network tap illustrated in FIG. 2 in more detail. Referring to FIG. 3, when network tap 200 loses external power, battery 220 provides temporary power to SFP+ transceivers 112A-112C, multiplexer/demultiplexer modules 202A and 202B, but not to FPGA 114. When the external power loss occurs, for traffic received from the network via SFP+ transceiver 112A, multiplexer/demultiplexer module 202A selects demultiplexer outputs 301 and provides the signal from network A to those outputs and to multiplexer/demultiplexer module 202B, as indicated by arrow 302, which represents a chip-to-chip loopback connection between multiplexer/demultiplexer modules 202A and 202B. Multiplexer/demultiplexer module 202B provides the signal from loopback connection 302 to internal multiplexer 304. Internal multiplexer 304 selects inputs 305 and provides the signal received from multiplexer/demultiplexer 202A to SFP+ transceiver 112B via connection 306. Thus, traffic received from the network via SFP+ transceiver 112A is automatically looped back to the same or a different network via multiplexer/demultiplexer modules 202A and 202B and SFP+ transceivers 112A and 112B using a chip-to-chip loopback connection. In addition, by powering only the modules involved in the loopback operation using internal battery 220 when network tap 200 loses external power, battery size is reduced over implementations when the entire tap is powered by a backup battery when a power failure occurs.

Similarly, when external power is lost, for traffic received from the network via SFP+ transceiver 112B, internal demultiplexer 307 of multiplexer/demultiplexer module 202B provides the signal to outputs 308 and to multiplexer/demultiplexer module 202A via chip-to-chip loopback connection 310. Multiplexer/demultiplexer module 202A provides the signal from connection 310 to internal multiplexer 312 which, selects inputs 311 and provides the signal to SFP+ transceiver 112A via connection 314.

When network tap 200 is externally powered, SFP+ transceiver 112A receives an optical signal from the network, converts the optical signal into an electrical signal, and provides the electrical signal to multiplexer/demultiplexer module 202A vial connection 313. Demultiplexer 300 within multiplexer/demultiplexer module 202A receives the electrical signal from SFP+ transceiver 112A and provides the output signal to FPGA 114 via outputs 316 and connection 317.

FPGA 114 may perform a network monitoring task, such as copying packets from the signal received from demultiplexer 300. FPGA 114 also provides the signal from network A to multiplexer/demultiplexer module 202B via connection 319. Internal multiplexer 304 of multiplexer/demultiplexer module 202B provides the signal from network A to SFP+ transceiver 112B via connection 306. SFP+ transceiver 112B converts the signal from network A back into an optical signal and provides the signal to network B.

When external power is connected to network tap 200, SFP+ transceiver 112B receives an optical signal from network B, converts the optical signal into an electrical signal, and provides the electrical signal to multiplexer/demultiplexer module 202B via connection 321. Demultiplexer 307 within multiplexer/demultiplexer module 202B provides the electrical signal from network B to FPGA 114 via connection 323. FPGA 114 performs a network monitoring task, such as copying packets from network B to a network monitoring application, such as a network performance monitoring application, an intrusion detection application, an intrusion protection application, etc. FPGA 114 also provides the electrical signal from network B to multiplexer/demultiplexer module 202A via connection 324. Multiplexer 312 of multiplexer/demultiplexer module 202A provides the electrical signal from network B to SFP+ transceiver 112A via connection 314. SFP+ transceiver 112A converts the electrical signal from network B into an optical signal and provides the optical signal to network A.

Figure 4:
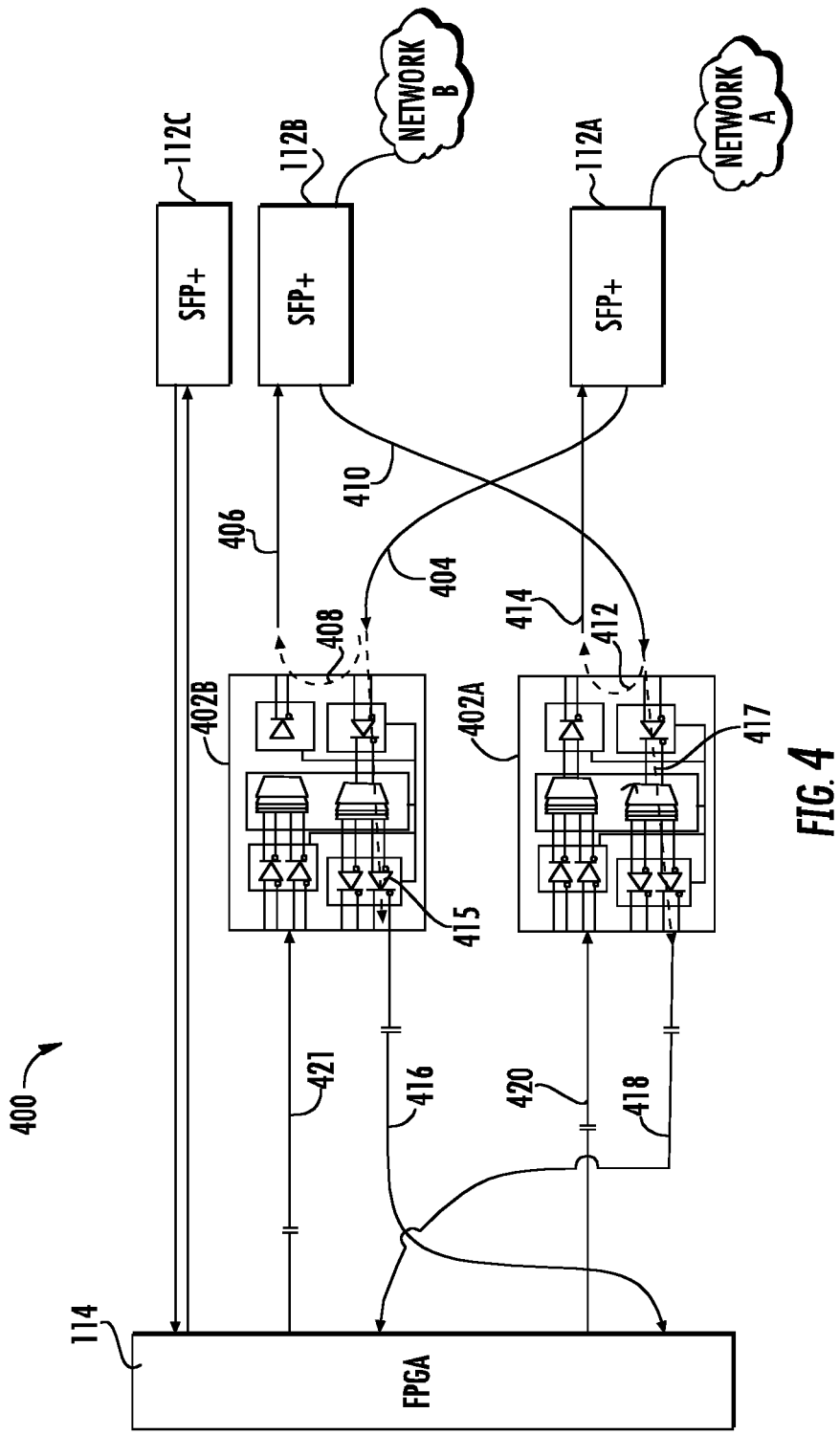
FIG. 4 is a diagram illustrating an alternate architecture for a network tap with battery assisted failover according to an aspect of the subject matter described herein.

In the examples illustrated in FIGS. 2 and 3, in the failover mode, only the multiplexer/demultiplexer modules 202A and 202B and the transceivers are powered by battery 220. Traffic is forwarded from one multiplexer/demultiplexer module 202A to another multiplexer/demultiplexer module 202B, and multiplexer/demultiplexer modules 202A and 202B are implemented on different chips. While such a solution is advantageous over solutions where the entire network tap is provided backup power by a battery, chip-to-chip loopback may introduce timing jitter into network traffic flows. FIG. 4 illustrates an alternate implementation in which multiplexer/demultiplexer modules have internal loopback capabilities to loop traffic received on one input the multiplexer/demultiplexer module to an output of the same multiplexer/demultiplexer module on the same chip, thereby avoiding chip-to-chip loopback and decreasing jitter. Referring to FIG. 4, network tap 400 includes SFP+ transceivers 112A-C and FPGA 114 as described above. Network tap 400 further includes multiplexer/demultiplexer modules 402A and 402B with built in loopback functionality where network traffic received on one port can be looped back to another port of the receiving multiplexer/demultiplexer module. Although not illustrated in FIG. 4, it is assumed that multiplexer/demultiplexer modules 402A and 402B and SFP+ transceivers 112A-112C are powered by battery 220 when operating in the failover mode. It is also assumed that FPGA 114 is not powered by battery 220 in the failover mode.

When operating in failover mode, network A traffic received by SFP+ transceiver 112A is provided to multiplexer/demultiplexer module 402B via connection 404. Multiplexer/demultiplexer module 402B loops the traffic received at one of its input ports via connection 404 to one of its output ports connected to connection 406 and to SFP+ transceiver 112B. The internal loopback functionality of multiplexer/demultiplexer 402B is indicated by dashed arrow 408.

Network B traffic received by SFP+ transceiver 112B is provided to multiplexer/demultiplexer module 402A via connection 410. When external power is lost, the traffic received via connection 410 is looped to SFP+ transceiver 112A via internal loopback connection 412 and connection 414. SFP+ transceiver 112A converts the electrical signal to an optical signal and provides the optical signal to network A.

When external power is available to network tap 400, network A traffic received by SFP+ transceiver 112A is provided to multiplexer/demultiplexer module 402B via connection 404. The traffic is then forwarded to FPGA 114 via internal connection 415 and external connection 416. FPGA 114 performs network monitoring processing for the received network A traffic and provides the original traffic to multiplexer/demultiplexer module 402A via connection 420. Multiplexer/demultiplexer module 402A provides the traffic to SFP+ transceiver 112A via connection 406. SFP+ transceiver 112A converts the electrical signal to an optical signal and provides the optical signal to network A.

Network B traffic received from SFP+ transceiver 112B is provided to multiplexer/demultiplexer module 402A via connection 410. The traffic is then provided to FPGA 114 via internal connection 417 and external connection 418. FPGA 114 performs network monitoring processing of the received network B traffic and provides the traffic to multiplexer/demultiplexer module 402B via connection 421. Multiplexer/demultiplexer module 402B then provides the network B traffic to SFP transceiver 112B via connection 406. SFP+ transceiver 112B converts the electrical signal into an optical signal and provides the optical signal to network B.

Thus, the architecture illustrated in FIG. 4 is advantageous over that illustrated in FIGS. 2 and 3 in that it does not require loopback between multiplexer/demultiplexer chips when external power is not provided to network tap 400.

As stated above, one problem with some network taps is that they only have a fail open capability or only a fail closed capability. According to one aspect of the subject matter described herein, any of the network taps described herein may be programmable to operate in a fail open or fail closed mode of operation. In a fail open mode of operation, network traffic is allowed to pass through the network tap when external power is lost, as described above with respect to FIGS. 2-4. In a fail closed mode of operation, the network tap may block network traffic, for example, to allow other protection switching mechanisms to occur.

Figure 5:
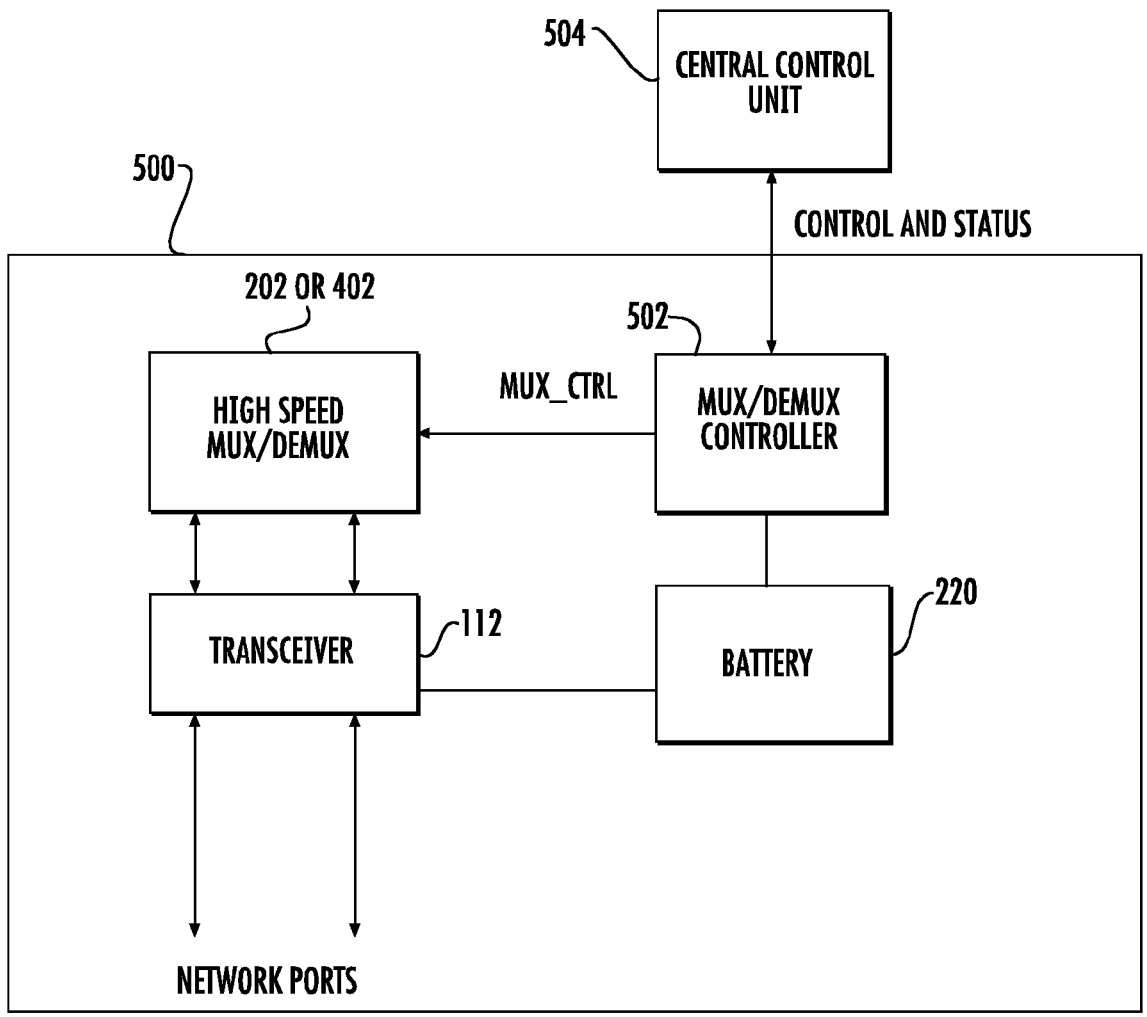
FIG. 5 is a diagram illustrating a network tap with programmable failover functionality according to an aspect of the subject matter described herein.

FIG. 5 is a block diagram illustrating a network tap that is programmable to operate in fail open or fail closed mode according to an aspect of the subject matter described herein. Referring to FIG. 5, network tap 500 includes multiplexer/demultiplexer module(s) 202 or 402, transceivers 112, and battery 220 as described above. In addition, network tap 500 may include a mux/demux controller 502 that controls multiplexer/demultiplexer module 202 or 402 to operate in a fail open or a fail closed mode. To enable such a feature, a central control until 420 may write a value to a register either within or accessible by controller 502 to indicate fail open or fail closed mode.

In fail open mode, traffic received on one of network ports proceeds through transceivers 112 to high speed mux/demux 202 or 402 and proceeds or is looped back to transceivers 112 and out another network port, as described above. In fail closed mode, traffic received on network ports is blocked by not activating the loopback functionality of high speed mux/demux 402. Thus, the subject matter described herein includes a network tap that is programmable to operate in fail open or fail closed mode in combination with the above-described advantages of providing high speed mux and demux to control the fail open mode and using battery 220 to only power portions of network tap 500 that are needed to operate in fail open mode.

Figure 6:
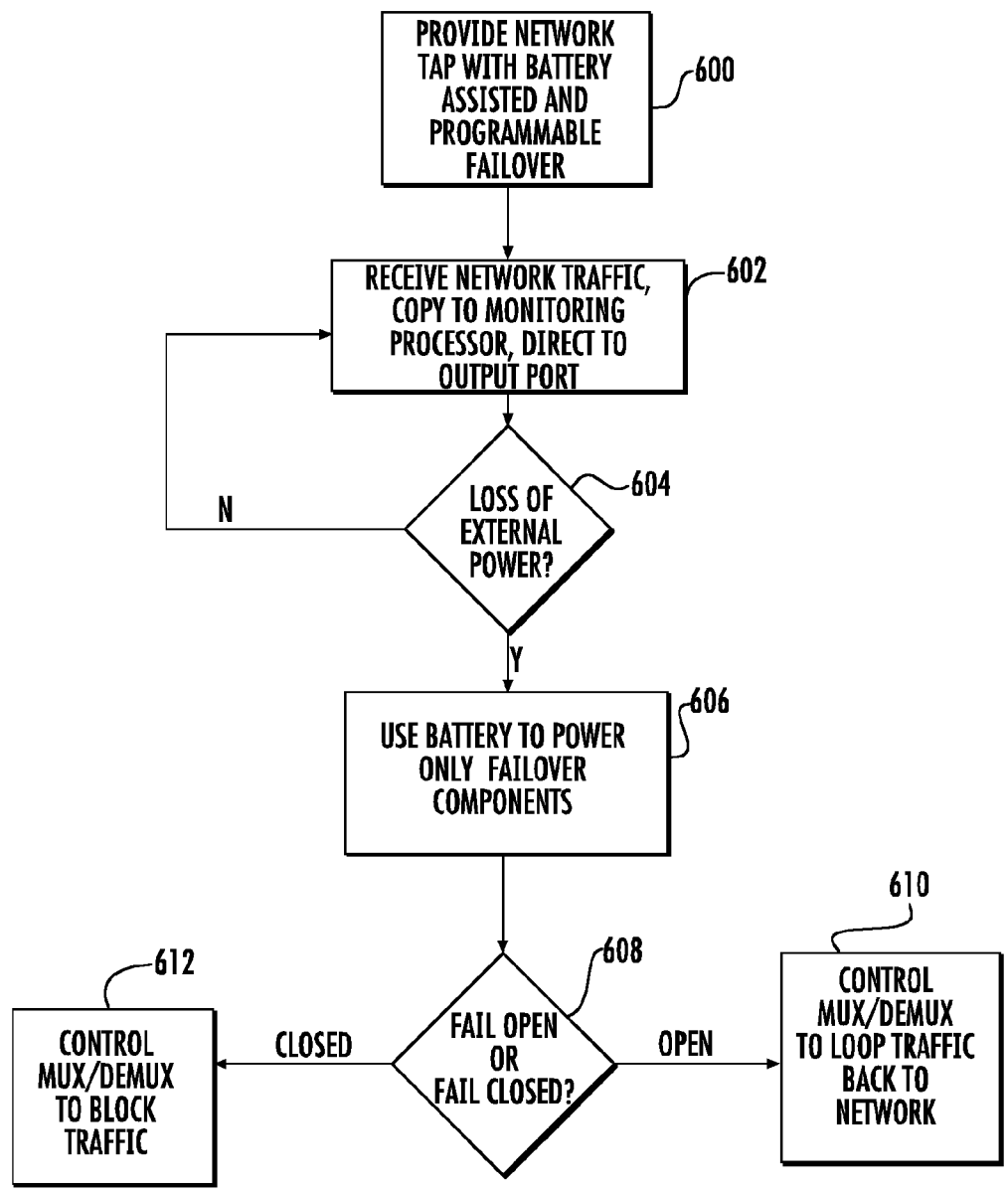
FIG. 6 is a flow chart illustrating an exemplary method for operating a network tap with battery assisted and programmable failover according to an aspect of the subject matter described herein.

FIG. 6 is a flow chart illustrating an exemplary process for operating a network tap according to an aspect of the subject matter described herein. Referring to FIG. 6, in step 600, a network tap with battery assisted and programmable failover is provided. For example, a network tap as illustrated in any of FIGS. 2-5 may be provided.

In step 602, network traffic is received at the network tap, the traffic is copied to a monitoring processor, and directed to an output port. For example, in the normal or powered mode where the network tap is connected to external power, traffic may be monitored and redirected back to the network via an output port.

In step 604, it is determined whether a loss of external power has occurred. If a power loss has not occurred, control returns to step 602 where the receiving and monitoring of traffic is continued. If a loss of external power has occurred, control proceeds to step 606 where the battery is used to only power failover components. In the examples illustrated above, the failover components include the electrical to optical transceivers and the multiplexer and demultiplexer modules. For aspects in which the network tap is programmable, the failover components may also include the multiplexer/demultiplexer controller illustrated in FIG. 6. If the failover mode is fail open, control proceeds to step 610 where the multiplexer/demultiplexer module(s) is controlled to loop traffic back to the network. The loopback may be performed as illustrated in any of FIGS. 2-4. If the network tap operates in fail closed mode, control proceeds to step 612 where the multiplexer/demultiplexer module is controlled to block network traffic by not activating its internal or external loopback function.

Thus, by providing a network tap with programmable and battery assisted failover, the subject matter described herein is advantageous over conventional network taps that require optical switches per interface pair. The subject matter described herein is also advantageous over network tap implementations where battery backup powers the entire device, including network monitoring functions during failover. The network tap described herein is also advantageous over non-programmable network taps where the failover mode is fixed.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A network tap comprising:
a processing element;
at least one optical-electrical transceiver for receiving an optical signal from a network and for converting the optical signal into an electrical signal;
at least one multiplexer/demultiplexer module coupled to the at least one optical-electrical transceiver for operating in a first mode when the network tap is externally powered, wherein, when operating in the first mode, the at least one multiplexer/demultiplexer module provides the electrical signal to the processing element, which performs a network monitoring task for the electrical signal, wherein the at least one multiplexer/demultiplexer module is configured to operate in a second mode comprising a fail open mode when the network tap is not externally powered wherein, when operating in the second mode, the at least one multiplexer/demultiplexer module ceases providing the electrical signal to the processing element and implements a loopback operation for the electrical signal, wherein the at least one multiplexer/demultiplexer module comprises a multiplexer/demultiplexer module located on a single chip and wherein implementing the loopback operation includes looping the electrical signal from an input port of the multiplexer/demultiplexer module to an output port of the multiplexer/demultiplexer module; and a power source internal to the network tap for providing temporary power to optical-electrical transceiver and the multiplexer/demultiplexer module for operating in the second mode.

2. The network tap of claim 1 the at least one optical-electrical transceiver comprises at least one small form factor pluggable (SFP) transceiver.

3. The network tap of claim 2 wherein the at least one SFP transceiver comprises at least one SFP+ transceiver.

4. A network tap comprising:
a processing element;
at least one optical-electrical transceiver for receiving an optical signal from a network and for converting the optical signal into an electrical signal;
at least one multiplexer/demultiplexer module coupled to the at least one optical-electrical transceiver for operating in a first mode when the network tap is externally powered, wherein, when operating in the first mode, the at least one multiplexer/demultiplexer module provides the electrical signal to the processing element, which performs a network monitoring task for the electrical signal, wherein the at least one multiplexer/demultiplexer module is configured to operate in a second mode comprising a fail open mode when the network tap is not externally powered wherein, when operating in the second mode, the at least one multiplexer/demultiplexer module ceases providing the electrical signal to the processing element and implements a loopback operation for the electrical signal, wherein the at least one multiplexer/demultiplexer module comprises a first multiplexer/demultiplexer module located on a first chip and a second multiplexer/demultiplexer module located on a second chip separate from the first chip, and wherein implementing the loopback operation includes looping the electrical signal from the first multiplexer/demultiplexer module to the second multiplexer/demultiplexer module.

5. The network tap of claim 1 wherein the power source does not power the processing element.

6. The network tap of claim 1 wherein the processing element monitors network traffic carried by the electrical signal.

7. The network tap of claim 1 wherein the power source comprises a battery.

8. The network tap of claim 1 wherein the optical signal comprises a ten gigabit Ethernet signal.

9. The network tap of claim 1 wherein the at least one multiplexer/demultiplexer module is programmable to operate in the second mode or in a third mode when the network tap is not externally powered, wherein operating in the third mode includes a fail closed mode in which the at least one multiplexer/demultiplexer module blocks traffic to or from the network from flowing through the network tap.

10. A network tap comprising:
a processing element;
at least one optical-electrical transceiver for receiving an optical signal from a network and for converting the optical signal into an electrical signal;
at least one multiplexer/demultiplexer module coupled to the at least one optical-electrical transceiver for operating in a first mode when the network tap is externally powered, wherein, when operating in the first mode, the at least one multiplexer/demultiplexer module provides the electrical signal to the processing element, which performs a network monitoring task for the electrical signal; and
a multiplexer/demultiplexer controller coupled to the at least one multiplexer/demultiplexer module, wherein the multiplexer/demultiplexer controller is programmable to control the at least one multiplexer/demultiplexer module to operate in a second mode comprising a fail open mode or a third mode comprising a fail closed mode when the network tap is not externally powered wherein, when operating in the second mode, the at least one multiplexer/demultiplexer module ceases providing the electrical signal to the processing element and implements a loopback operation for the electrical signal and wherein, when operating in the third mode, the at least one multiplexer/demultiplexer module blocks traffic to or from the network from flowing through the network tap, wherein the at least one multiplexer/demultiplexer module comprises a multiplexer/demultiplexer module located on a single chip and wherein implementing the loopback operation comprises looping the electrical signal from an input port of the multiplexer/demultiplexer module to an output port of the multiplexer/demultiplexer module.

11. The network tap of claim 10 the at least one optical-electrical transceiver comprises at least one small form factor pluggable (SFP) transceiver.

12. The network tap of claim 11 wherein the at least one SFP transceiver comprises at least one SFP+ transceiver.

13. A network tap comprising:
a processing element;
at least one optical-electrical transceiver for receiving an optical signal from a network and for converting the optical signal into an electrical signal;
at least one multiplexer/demultiplexer module coupled to the at least one optical-electrical transceiver for operating in a first mode when the network tap is externally powered, wherein, when operating in the first mode, the at least one multiplexer/demultiplexer module provides the electrical signal to the processing element, which performs a network monitoring task for the electrical signal; and
a multiplexer/demultiplexer controller coupled to the at least one multiplexer/demultiplexer module, wherein the multiplexer/demultiplexer controller is programmable to control the at least one multiplexer/demultiplexer module to operate in a second mode comprising a fail open mode or a third mode comprising a fail closed mode when the network tap is not externally powered wherein, when operating in the second mode, the at least one multiplexer/demultiplexer module ceases providing the electrical signal to the processing element and implements a loopback operation for the electrical signal and wherein, when operating in the third mode, the at least one multiplexer/demultiplexer module blocks traffic to or from the network from flowing through the network tap, wherein the at least one multiplexer/demultiplexer module comprises a first multiplexer/demultiplexer module located on a first chip and a second multiplexer/demultiplexer module located on a second chip separate from the first chip and wherein implementing the loopback operation comprises looping the electrical signal from the first multiplexer/demultiplexer module to the second multiplexer/demultiplexer module.

14. The network tap of claim 10 comprising a power source for powering the at least one optical-electrical transceiver, the at least one multiplexer/demultiplexer module and the multiplexer/demultiplexer controller when operating in the second or the third mode.

15. The network tap of claim 14 wherein the power source does not power the processing element.

16. The network tap of claim 14 wherein the power source comprises a battery.

17. The network tap of claim 10 wherein the processing element monitors network traffic carried by the electrical signal.

18. The network tap of claim 10 wherein the optical signal comprises a ten gigabit Ethernet signal.

* * * * *